(12) United States Patent
Asahina (10) Patent No.: US 9,172,502 B2
(45) Date of Patent: Oct. 27, 2015

(54) RECEIVING APPARATUS AND RECEIVING METHOD

(71) Applicant: MITSUBISHI ELECTRIC CORPORATION, Tokyo (JP)

(72) Inventor: Tsutomu Asahina, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 13/972,470

(22) Filed: Aug. 21, 2013

(65) Prior Publication Data

US 2014/0056387 A1 Feb. 27, 2014

(30) Foreign Application Priority Data

Aug. 22, 2012 (JP) .................................. 2012-183173

(51) Int. Cl.
*H04L 5/12* (2006.01)
*H04L 1/00* (2006.01)

(52) U.S. Cl.
CPC .............. *H04L 1/006* (2013.01); *H04L 1/0047* (2013.01); *H04L 1/0052* (2013.01)

(58) Field of Classification Search
CPC ... H04L 1/006; H04L 25/4917; H04L 25/497; H04L 1/0045; H04L 1/005; H04L 1/0057; H04L 1/0058
USPC ......................................... 375/262, 265, 341
See application file for complete search history.

(56) References Cited

U.S. PATENT DOCUMENTS

| | | | |
|---|---|---|---|
| 5,838,729 A | 11/1998 | Hu et al. | |
| 6,088,404 A | 7/2000 | Jekal | |
| 6,608,870 B1 * | 8/2003 | Fimoff | 375/270 |
| 6,668,014 B1 * | 12/2003 | Endres et al. | 375/232 |
| 6,823,489 B2 | 11/2004 | Wittig et al. | |
| 6,993,070 B1 * | 1/2006 | Berthet et al. | 375/232 |
| 7,027,533 B2 * | 4/2006 | Abe et al. | 375/341 |
| 7,043,440 B2 * | 5/2006 | Shioda et al. | 704/500 |
| 7,215,611 B2 * | 5/2007 | Yanase et al. | 369/47.13 |
| 7,289,569 B2 | 10/2007 | Markman | |

(Continued)

FOREIGN PATENT DOCUMENTS

| JP | 10-51780 A | 2/1998 |
|---|---|---|
| JP | 10-322229 A | 12/1998 |

(Continued)

*Primary Examiner* — Emmanuel Bayard
(74) *Attorney, Agent, or Firm* — Birch, Stewart, Kolasch & Birch, LLP (57) ABSTRACT

Provided is a receiving apparatus that includes a receiving unit which receives a trellis-coded modulation signal in which data items modulated by a plurality of trellis-coded modulators have been multiplexed; a data processing unit which arranges the data items multiplexed in the trellis-coded modulation signal received by the receiving unit so that a given number of data items modulated by one of the trellis-coded modulators are arranged consecutively in first order in which the data items modulated by one of the trellis-coded modulators have been modulated as arrangement processing and the arrangement processing is repeated in remaining trellis-coded modulators; a trellis decoding unit which performs trellis decoding of the data items arranged by the data processing unit, thereby producing decoded data items; and a data rearranging unit which rearranges the decoded data items in second order in which the decoded data items have been multiplexed in the trellis-coded modulation signal.

14 Claims, 6 Drawing Sheets

(56) References Cited

U.S. PATENT DOCUMENTS

| | | | |
|---|---|---|---|
| 7,653,143 B2* | 1/2010 | Kim et al. | 375/270 |
| 8,793,551 B2* | 7/2014 | Zhou et al. | 714/752 |
| 8,937,996 B2* | 1/2015 | Isson et al. | 375/233 |
| 2004/0025102 A1* | 2/2004 | Yokokawa et al. | 714/755 |
| 2005/0018786 A1* | 1/2005 | Parhi et al. | 375/265 |
| 2006/0176977 A1* | 8/2006 | Jafarkhani et al. | 375/298 |
| 2009/0103664 A1* | 4/2009 | Jeong et al. | 375/341 |
| 2009/0103665 A1* | 4/2009 | Jeong et al. | 375/341 |
| 2010/0039569 A1* | 2/2010 | Jeong et al. | 348/726 |
| 2011/0078533 A1* | 3/2011 | Zhou et al. | 714/752 |
| 2011/0116515 A1* | 5/2011 | Van Houtum et al. | 370/479 |

FOREIGN PATENT DOCUMENTS

| | | |
|---|---|---|
| JP | 2004-533753 A | 11/2004 |
| JP | 2005-523654 A | 8/2005 |
| JP | 4113600 B2 | 4/2008 |
| WO | WO 02/087181 A1 | 10/2002 |
| WO | WO 03/090451 A2 | 10/2003 |

* cited by examiner

| | SYMBOL-ORDER 1 BYTE-ORDER 1 | | | SYMBOL-ORDER 2 BYTE-ORDER 1 | | | SYMBOL-ORDER 3 BYTE-ORDER 2 | | | SYMBOL-ORDER 1 BYTE-ORDER 3 | | | SYMBOL-ORDER 2 BYTE-ORDER 4 | | | SYMBOL-ORDER 1 BYTE-ORDER 1 | | |
|---|---|---|---|---|---|---|---|---|---|---|---|---|---|---|---|---|---|---|
| symbol | SEGMENT 0 | | | SEGMENT 1 | | | SEGMENT 2 | | | SEGMENT 3 | | | SEGMENT 3 | | | SEGMENT 4 | | |
| | trellis | byte | bit | trellis | byte | bit | trellis | byte | bit | trellis | byte | bit | trellis | byte | bit | trellis | byte | bit |
| 0 | 0 | 0 | 7,6 | 4 | 208 | 5,4 | 8 | 412 | 3,2 | 0 | 616 | 1,0 | 4 | 828 | 7,6 | | | |
| 1 | 1 | 1 | 7,6 | 5 | 209 | 5,4 | 9 | 413 | 3,2 | 1 | 617 | 1,0 | 5 | 829 | 7,6 | | | |
| 2 | 2 | 2 | 7,6 | 6 | 210 | 5,4 | 10 | 414 | 3,2 | 2 | 618 | 1,0 | 6 | 830 | 7,6 | | | |
| 3 | 3 | 3 | 7,6 | 7 | 211 | 5,4 | 11 | 415 | 3,2 | 3 | 619 | 1,0 | 7 | 831 | 7,6 | | | |
| 4 | 4 | 4 | 7,6 | 8 | 212 | 5,4 | 0 | 416 | 3,2 | 4 | 620 | 1,0 | 8 | 832 | 7,6 | | | |
| 5 | 5 | 5 | 7,6 | 9 | 213 | 5,4 | 1 | 417 | 3,2 | 5 | 621 | 1,0 | 9 | 833 | 7,6 | | | |
| 6 | 6 | 6 | 7,6 | 10 | 214 | 5,4 | 2 | 418 | 3,2 | 6 | 622 | 1,0 | 10 | 834 | 7,6 | | | |
| 7 | 7 | 7 | 7,6 | 11 | 215 | 5,4 | 3 | 419 | 3,2 | 7 | 623 | 1,0 | 11 | 835 | 7,6 | | | |
| 8 | 8 | 8 | 7,6 | 0 | 204 | 5,4 | 4 | 408 | 3,2 | 8 | 612 | 1,0 | 0 | 836 | 7,6 | | | |
| 9 | 9 | 9 | 7,6 | 1 | 205 | 5,4 | 5 | 409 | 3,2 | 9 | 613 | 1,0 | 1 | 837 | 7,6 | | | |
| 10 | 10 | 10 | 7,6 | 2 | 206 | 5,4 | 6 | 410 | 3,2 | 10 | 614 | 1,0 | 2 | 838 | 7,6 | | | |
| 11 | 11 | 11 | 7,6 | 3 | 207 | 5,4 | 7 | 411 | 3,2 | 11 | 615 | 1,0 | 3 | 839 | 7,6 | | | |
| 12 | 0 | 0 | 5,4 | 4 | 208 | 3,2 | 8 | 412 | 1,0 | 0 | 624 | 7,6 | 4 | 828 | 5,4 | | | |
| ... | ... | ... | ... | ... | ... | ... | ... | ... | ... | ... | ... | ... | ... | ... | ... | | | |
| 19 | 7 | 7 | 5,4 | 11 | 215 | 3,2 | 3 | 419 | 1,0 | 7 | 631 | 7,6 | 11 | 835 | 5,4 | | | |
| 20 | 8 | 8 | 5,4 | 0 | 204 | 3,2 | 4 | 408 | 1,0 | 8 | 632 | 7,6 | 0 | 836 | 5,4 | | | |
| 21 | 9 | 9 | 5,4 | 1 | 205 | 3,2 | 5 | 409 | 1,0 | 9 | 633 | 7,6 | 1 | 837 | 5,4 | | | |
| 22 | 10 | 10 | 5,4 | 2 | 206 | 3,2 | 6 | 410 | 1,0 | 10 | 634 | 7,6 | 2 | 838 | 5,4 | | | |
| 23 | 11 | 11 | 5,4 | 3 | 207 | 3,2 | 7 | 411 | 1,0 | 11 | 635 | 7,6 | 3 | 839 | 5,4 | | | |
| 24 | 0 | 0 | 3,2 | 4 | 208 | 1,0 | 8 | 420 | 7,6 | 0 | 624 | 5,4 | 4 | 828 | 3,2 | | | |
| 25 | 1 | 1 | 3,2 | 5 | 209 | 1,0 | 9 | 421 | 7,6 | 1 | 625 | 5,4 | 5 | 829 | 3,2 | | | |
| ... | ... | ... | ... | ... | ... | ... | ... | ... | ... | ... | ... | ... | ... | ... | ... | | | |
| 31 | 7 | 7 | 3,2 | 11 | 215 | 1,0 | 3 | 427 | 7,6 | 7 | 631 | 5,4 | 11 | 835 | 3,2 | | | |
| 32 | 8 | 8 | 3,2 | 0 | 204 | 1,0 | 4 | 428 | 7,6 | 8 | 632 | 5,4 | 0 | 836 | 3,2 | | | |
| 33 | 9 | 9 | 3,2 | 1 | 205 | 1,0 | 5 | 429 | 7,6 | 9 | 633 | 5,4 | 1 | 837 | 3,2 | | | |
| 34 | 10 | 10 | 3,2 | 2 | 206 | 1,0 | 6 | 430 | 7,6 | 10 | 634 | 5,4 | 2 | 838 | 3,2 | | | |
| 35 | 11 | 11 | 3,2 | 3 | 207 | 1,0 | 7 | 431 | 7,6 | 11 | 635 | 5,4 | 3 | 839 | 3,2 | | | |
| 36 | 0 | 0 | 1,0 | 4 | 216 | 7,6 | 8 | 420 | 5,4 | 0 | 624 | 3,2 | 4 | 828 | 1,0 | | | |
| 37 | 1 | 1 | 1,0 | 5 | 217 | 7,6 | 9 | 421 | 5,4 | 1 | 625 | 3,2 | 5 | 829 | 1,0 | | | |
| ... | ... | ... | ... | ... | ... | ... | ... | ... | ... | ... | ... | ... | ... | ... | ... | | | |
| 47 | 11 | 11 | 1,0 | 3 | 227 | 7,6 | 7 | 431 | 5,4 | 11 | 635 | 3,2 | 3 | 839 | 1,0 | | | |
| 48 | 0 | 12 | 7,6 | 4 | 216 | 5,4 | 8 | 420 | 3,2 | 0 | 624 | 1,0 | 4 | 840 | 7,6 | | | |
| 49 | 1 | 13 | 7,6 | 5 | 217 | 5,4 | 9 | 421 | 3,2 | 1 | 625 | 1,0 | 5 | 841 | 7,6 | | | |
| ... | ... | ... | ... | ... | ... | ... | ... | ... | ... | ... | ... | ... | ... | ... | ... | | | |
| 815 | 11 | 203 | 1,0 | 3 | 419 | 7,6 | 7 | 623 | 5,4 | 11 | 827 | 3,2 | 3 | 1031 | 1,0 | | | |
| 816 | 0 | 204 | 7,6 | 4 | 408 | 5,4 | 8 | 612 | 3,2 | 0 | 816 | 1,0 | 4 | 1032 | 7,6 | | | |
| 817 | 1 | 205 | 7,6 | 5 | 409 | 5,4 | 9 | 613 | 3,2 | 1 | 817 | 1,0 | 5 | 1033 | 7,6 | | | |
| 818 | 2 | 206 | 7,6 | 6 | 410 | 5,4 | 10 | 614 | 3,2 | 2 | 818 | 1,0 | 6 | 1034 | 7,6 | | | |
| 819 | 3 | 207 | 7,6 | 7 | 411 | 5,4 | 11 | 615 | 3,2 | 3 | 819 | 1,0 | 7 | 1035 | 7,6 | | | |
| 820 | 4 | 208 | 7,6 | 8 | 412 | 5,4 | 0 | 616 | 3,2 | 4 | 820 | 1,0 | 8 | 1036 | 7,6 | | | |
| 821 | 5 | 209 | 7,6 | 9 | 413 | 5,4 | 1 | 617 | 3,2 | 5 | 821 | 1,0 | 9 | 1037 | 7,6 | | | |
| 822 | 6 | 210 | 7,6 | 10 | 414 | 5,4 | 2 | 618 | 3,2 | 6 | 822 | 1,0 | 10 | 1038 | 7,6 | | | |
| 823 | 7 | 211 | 7,6 | 11 | 415 | 5,4 | 3 | 619 | 3,2 | 7 | 823 | 1,0 | 11 | 1039 | 7,6 | | | |
| 824 | 8 | 212 | 7,6 | 0 | 416 | 5,4 | 4 | 620 | 3,2 | 8 | 824 | 1,0 | 0 | 1040 | 7,6 | | | |
| 825 | 9 | 213 | 7,6 | 1 | 417 | 5,4 | 5 | 621 | 3,2 | 9 | 825 | 1,0 | 1 | 1041 | 7,6 | | | |
| 826 | 10 | 214 | 7,6 | 2 | 418 | 5,4 | 6 | 622 | 3,2 | 10 | 826 | 1,0 | 2 | 1042 | 7,6 | | | |
| 827 | 11 | 215 | 7,6 | 3 | 419 | 5,4 | 7 | 623 | 3,2 | 11 | 827 | 1,0 | 3 | 1043 | 7,6 | | | |

RECEIVING APPARATUS AND RECEIVING METHOD

BACKGROUND OF THE INVENTION

1. Field of the Invention

The present invention relates to a receiving apparatus and a receiving method.

2. Description of the Related Art

Digitization of television broadcasts and radio broadcasts has been proceeding on the global scale in recent years. The ATSC (Advanced Television Systems Committee) standards for a terrestrial digital broadcasting system in the United States specifies the following processes: First, signal processing such as Reed-Solomon encoding and interleaving is performed on transport streams (also referred to below as TSs) specified by an international compression coding standard MPEG2 (Moving Picture Experts Group 2). Then, coded modulation is performed by twelve trellis-coded modulators on data on which the signal processing has been performed. Thereafter, the code-modulated data are multiplexed and transmitted in a form of a single carrier wave.

Accordingly, a conventional receiver compliant with the ATSC standards performs synchronous processing and equalization processing on a signal received by a tuner, and then executes twelve trellis decoding processes in parallel on the signal on which the processing has been performed. In this case, the receiver includes twelve identical processing circuits, and therefore circuit size of the receiver is large.

In a technology disclosed in Japanese Patent Publication No. 4113600 (paragraphs 0042 to 0055, FIG. 10 and FIG. 15), a signal group is generated by arranging multiplexed modulation signals cyclically in accordance with the respective trellis-coded modulators that have performed trellis-coded modulation processing. Then, the generated signal group is input to a trellis decoding circuit. The trellis decoding circuit performs traceback processing while identifying in foregoing processing the trellis-coded modulator that has processed the code-modulated signals arranged in the signal group. The technology disclosed in the Japanese Patent Publication proposes the processing described above to configure a receiver with a single trellis decoding circuit.

The technology disclosed in the Japanese Patent Publication, however, requires a memory that can store at least one signal group of cyclically arranged signals and requires the foregoing processing to identify the trellis-coded modulator that has processed the code-modulated signals, thereby increasing required memory capacity and circuit size. This would bring about increased cost of components such as a large-scale integrated circuit (LSI).

SUMMARY OF THE INVENTION

An object of the present invention is to provide a receiving apparatus and a receiving method that make it possible to decode trellis-coded modulation signals without increasing required memory capacity and circuit size, using a trellis decoding circuit included in the receiving apparatus.

According to an aspect of the present invention, a receiving apparatus includes a receiving unit which receives a trellis-coded modulation signal in which data items modulated by a plurality of trellis-coded modulators have been multiplexed; a data processing unit which arranges the data items multiplexed in the trellis-coded modulation signal received by the receiving unit so that a given number of data items modulated by one of the trellis-coded modulators are arranged consecutively in first order in which the data items modulated by one of the trellis-coded modulators have been modulated as arrangement processing and the arrangement processing is repeated in remaining trellis-coded modulators; a trellis decoding unit which performs trellis decoding of the data items arranged by the data processing unit, thereby producing decoded data items; and a data rearranging unit which rearranges the decoded data items in second order in which the decoded data items have been multiplexed in the trellis-coded modulation signal.

According to an aspect of the present invention, the trellis-coded modulation signal can be decoded without increasing required memory capacity and circuit size, even if a single trellis decoding circuit is used.

BRIEF DESCRIPTION OF THE DRAWINGS

In the attached drawings:

FIG. 3 is a table schematically showing relationships between inputs and outputs of the transmitting side circuit;

DETAILED DESCRIPTION OF THE INVENTION

An embodiment of a receiving apparatus and a receiving method to which the present invention is applied will be described. In the embodiment, a receiving apparatus and a receiving method for terrestrial digital broadcasting in the United States, using the Viterbi algorithm as a decoding algorithm, will be described, but the present invention is not confined to that.

Figure 1:
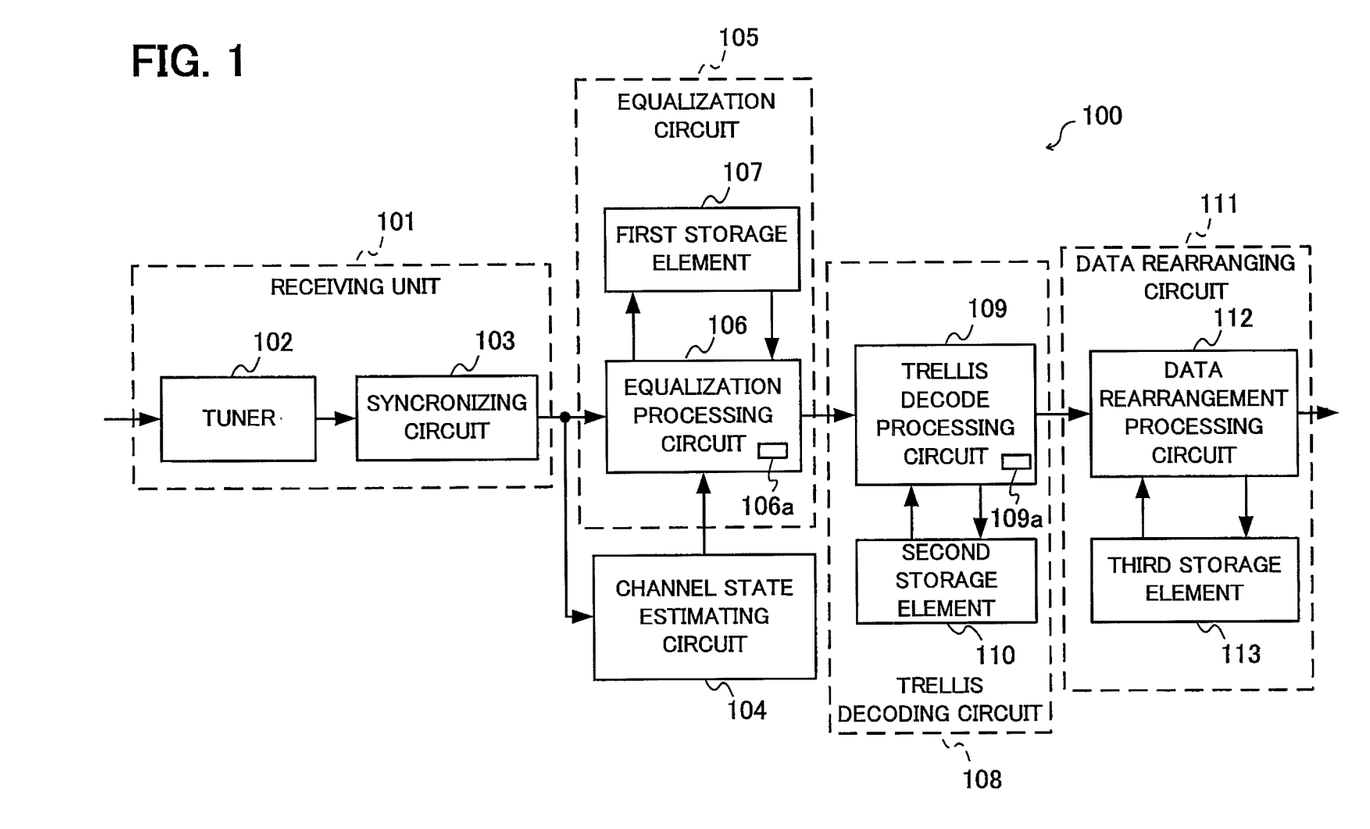
FIG. 1 is a block diagram schematically showing a configuration of a receiving apparatus according to an embodiment.

FIG. 1 is a block diagram schematically showing a configuration of a receiving apparatus 100 according to an embodiment. The receiving apparatus 100 can perform a receiving method to which the present invention is applied. The receiving apparatus 100 receives a signal (i.e., a trellis-coded modulation signal) in which data including data items modulated by a plurality of trellis-coded modulators have been multiplexed. As shown in the figure, the receiving apparatus 100 includes a receiving unit 101, a channel state estimating circuit 104 functioning as a channel state estimating unit, an equalization circuit 105 functioning as an equalizing unit, a trellis decoding circuit 108 functioning as a trellis decoding unit, and a data rearranging circuit 111 functioning as a data rearranging unit. Outputs of the data rearranging circuit 111 are processed in an external coding-decoding circuit and an inverse energy diffusion circuit, which are not shown in the figure, and the TSs are decoded and reproduced.

Here, the trellis-coded modulation signal received by the receiving apparatus 100 will be described.

Figure 2:
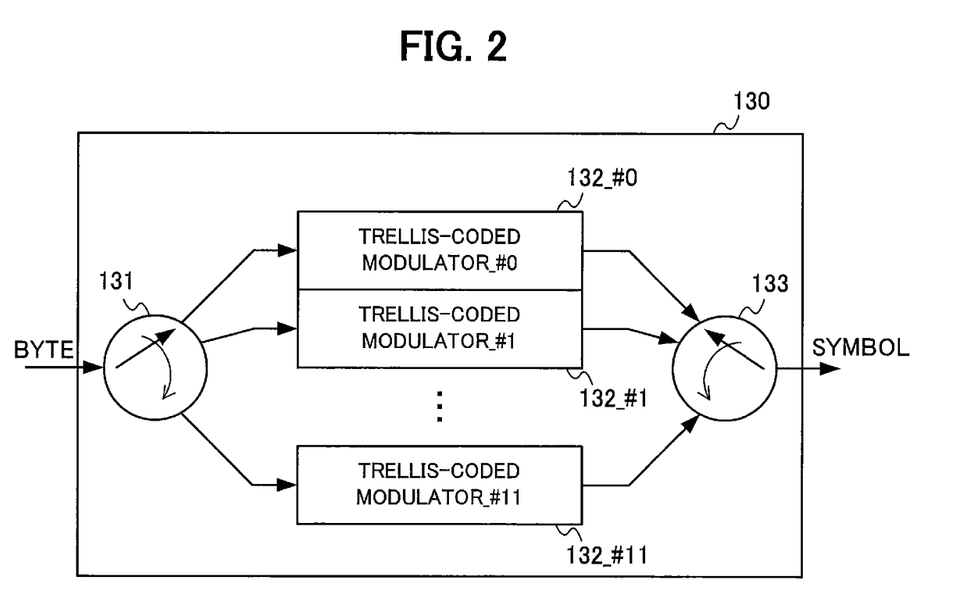
FIG. 2 is a block diagram schematically showing a configuration of a transmitting side circuit.

FIG. 2 is a block diagram schematically showing a configuration of a transmitting side circuit 130 in a transmitting apparatus conforming to the ATSC standards. The transmitting side circuit 130 modulates data items by a plurality of trellis-coded modulators and multiplexes the modulated data items. As shown in the figure, the transmitting side circuit 130 includes a byte switch 131, twelve trellis-coded modulators 132_#0 to 132_#11 (also referred to as trellis-coded modulators 132 when there is no particular need to distinguish among them), and a symbol switch 133.

Byte data are input to the transmitting side circuit 130. The byte switch 131 switches an output destination of the input byte data on a byte-by-byte basis. For example, the byte switch 131 switches the output destination in turn to any of the trellis-coded modulators 132_#0 to 132_#11 in order of the trellis-coded modulators 132_#0, 132_#1, 132_#2, ..., 132_#11. After the byte switch 131 switched the output designation to the trellis-coded modulator 132_#11, it switches the output designation to the trellis-coded modulator 132_#0 again. The byte switch 131 changes the output destination in turn cyclically as described above.

The trellis-coded modulator 132 encodes and modulates two-bit data included in the byte data assigned by the byte switch 131, thereby generating one symbol of data (also referred to as a data symbol).

The symbol switch 133 switches an input source of the data symbol on a symbol-by-symbol basis. For example, the symbol switch 133 switches the input source in turn to any of the trellis-coded modulators 132_#0 to 132_#11 in the order of the trellis-coded modulators 132_#0, 132_#1, 132_#2, ..., 132_#11, and after the symbol switch 133 switched the input source to the trellis-coded modulator 132_#11, it switches the input source to the trellis-coded modulator 132_#0 again. The symbol switch 133 changes the input source in turn cyclically as described above.

In the ATSC standards, a single segment includes 828 symbols (excluding a segment synchronization signal). Furthermore, in the ATSC standards, a position in each segment, at which switching order (byte-order) of the byte switch 131 changes, varies from segment to segment, and switching order (symbol-order) of the symbol switch 133 changes at a beginning position of each segment. These changes are illustrated in FIG. 3.

FIG. 3 is a table schematically showing relationships between inputs and outputs of the transmitting side circuit 130.

A "symbol" column in FIG. 3 shows order (i.e., symbol-order) of symbols output from the symbol switch 133. Each of "trellis" columns shows numbers assigned to the trellis-coded modulators 132 that have performed modulation. The numbers of the trellis-coded modulators 132 correspond to numbers N, each of which follows a hash sign # added at an end of the trellis-coded modulator 132 exemplarily shown in FIG. 2. Each of "byte" columns shows order (i.e., byte-order) of the byte data input to the byte switch 131. The "bit" column shows bits encoded and modulated by the trellis-coded modulator 132, of the byte data input from the byte switch 131.

In other words, the byte data are input to the byte switch 131 in the order shown in the "byte" columns; in the input byte data, the bits indicated in the "bit" columns are encoded and modulated by the trellis-coded modulators 132 indicated in the "trellis" columns; and the modulated bits are output as the data symbol in the order shown in the "symbol" column.

The position, at which the order of the byte switch 131 changes, is switched in each segment as shown in FIG. 3. In byte-order 1, byte data input order changes at a beginning of the segment (a position at which a value of "symbol" column is '0'). In byte-order 2, byte data input order changes at a position at which a value of "symbol" column is '36'. In byte-order 3, byte data input order changes at a position at which a value of "symbol" column is '24'. In byte-order 4, byte data input order changes at a position at which a value of "symbol" column is '12'.

For example, in segment 0, byte data are input cyclically, starting from the trellis-coded modulator 132_#0. In segment 1, because all the byte data input cyclically from the trellis-coded modulator 132_#0 have not been encoded and modulated yet, the byte-order 1 is first used in the same way as in the segment 0. After all those byte data are encoded and modulated, byte data are input cyclically, starting from the trellis-coded modulator 132_#4 (byte-order 2 in FIG. 3). In segment 2, byte data are first switched in byte-order 2, and from the position where byte-order 3 starts, byte data are input cyclically, starting from the trellis-coded modulator 132_#8.

As described later, the orders in the symbol switch 133 are changed at the beginning of each segment. Since there are three orders in the symbol switch 133, the trellis-coded modulators 132 to which byte data are input according to the byte-orders 1 to 4 take twelve segments to complete a full cycle.

The orders in the symbol switch 133 changes at the beginning of each segment. In symbol-order 1, symbols are received in turn, starting from the trellis-coded modulator 132_#0. In symbol-order 2, symbols are received in turn, starting from the trellis-coded modulator 132_#4. In symbol-order 3, symbols are received in turn, starting from the trellis-coded modulator 132_#8.

In segment 0, symbols are received in turn cyclically, starting from the trellis-coded modulator 132_#0. In segment 1, symbols are received in turn cyclically, starting from the trellis-coded modulator 132_#4. In segment 2, symbols are received in turn cyclically, starting from the trellis-coded modulator 132_#8. The same processes as those in the segments 0 to 2 are repeated in segment 3 and subsequent segments in three-segment cycles. As described above, in the trellis-coded modulation signal, multiplexing order is changed in a given period.

A multiplexed signal produced as described above is input to the receiving apparatus 100 according to this embodiment.

The receiving apparatus 100 in this embodiment is next described with reference to FIG. 1.

The receiving unit 101 receives the trellis-coded modulation signal in which the data items modulated by the plurality of trellis-coded modulators 132 have been multiplexed. The receiving unit 101 includes a tuner 102 functioning as a reception processing unit and a synchronizing circuit 103 functioning as a synchronizing unit.

The tuner 102 selects a broadcast wave as desired by a user, and then converts an RF signal received from outside to an IF signal to supply the IF signal to the synchronizing circuit 103.

The synchronizing circuit 103 extracts the trellis-coded modulation signal from the IF signal received from the tuner 102. The synchronizing circuit 103 corrects a frequency error and a clock frequency error in a carrier wave and detects a field synchronization signal and a segment synchronization signal on the basis of a extracted trellis-coded modulation signal. Then, the synchronizing circuit 103 supplies the extracted trellis-coded modulation signal to the equalization circuit 105 and gives a detection result of the synchronization signal to the channel state estimating circuit 104.

The channel state estimating circuit 104 estimates a channel state by using a fact that the field synchronization signal and the segment synchronization signal supplied from the synchronizing circuit 103 are known signals. It then estimates a channel state of a signal between the known signals by performing interpolation or extrapolation using a channel state obtained from the known signals. Then, the channel state estimating circuit 104 gives the equalization circuit 105 a channel estimation result corresponding to order of signals that have been read from a first storage element 107.

The equalization circuit 105 functions as a data processing unit which corrects distortion of the trellis-coded modulation signal received by the receiving unit 101 and arranges the multiplexed data items included in the trellis-coded modulation signal so that a given number of data items multiplexed by one of the trellis-coded modulators 132 are set in a row in the order (i.e., first order) in which the data items have been modulated. The equalization circuit 105 includes an equalization processing circuit 106 functioning as an equalization processing unit and the first storage element 107 functioning as a first storage unit.

The equalization processing circuit 106 in this embodiment functions as an equalization processing unit which equalizes the trellis-coded modulation signal and as a storage control unit which controls the first storage element 107. In other words, the equalization processing circuit 106 in this embodiment includes the equalization processing unit and the storage control unit.

The equalization processing circuit 106 supplies the first storage element 107 with the trellis-coded modulation signal received from the synchronizing circuit 103 and has the first storage element 107 store data indicated by this signal. By controlling the first storage element 107, the equalization processing circuit 106 reads out a given number of consecutive data items modulated by one of the trellis-coded modulators 132. The given number of consecutive data items modulated by one of the trellis-coded modulators 132 is referred to as a data block. The equalization processing circuit 106 also performs read control so that the data items modulated by one of the trellis-coded modulators 132 are arranged in the data blocks in the order in which the data items have been multiplexed. A data block which contains data items modulated by a certain trellis-coded modulator 132 is referred to as a first data block; and another data block which contains data items modulated by the certain trellis-coded modulator 132 and modulated next to the first data block is defined as a second data block. The equalization processing circuit 106 performs read control so that the first data block and the second data block are connected so as to arrange the first data block after the second data block, for example. A combination of the second data block and the first data block connected after the second data block is referred to as a data group. A data group which contains data items modulated by a certain trellis-coded modulator 132 is referred to as a first data group; and another data group which contains data items modulated by the certain trellis-coded modulator 132 and read after the first data group is referred to as the second data group. The equalization processing circuit 106 performs read control so that an anterior-half data block of the first data group becomes the same as a posterior-half data block of the second data group. The equalization processing circuit 106 repeats arrangement processing described above in remaining trellis-coded modulators 132. The equalization processing circuit 106 functions as the storage control unit as described above.

The equalization processing circuit 106 receives a signal of a read and arranged data group from the first storage element 107 and the channel estimation result from the channel state estimating circuit 104, corrects distortion of the signal to produce a corrected signal, and supplies the corrected signal to the trellis decoding circuit 108. The equalization processing circuit 106 may correct a signal supplied from the synchronizing circuit 103 to produce a corrected signal by using the channel estimation result supplied from the channel state estimating circuit 104 and have the first storage element 107 store data of the corrected signal. In this case, the channel state estimating circuit 104 does not need to make the channel estimation result correspond to the order in which signals have been read from the first storage element 107. The equalization processing circuit 106 functions as the equalization processing unit as described above.

The first storage element 107 stores data (trellis-coded modulation data) indicated by the trellis-coded modulation signal supplied from the synchronizing circuit 103, as controlled by the equalization processing circuit 106, and reads out the stored data as controlled by the equalization processing circuit 106.

The trellis decoding circuit 108 performs trellis decoding of the data arranged by the equalization circuit 105. The trellis decoding circuit 108 includes a trellis decode processing circuit 109 and a second storage element 110.

The trellis decode processing circuit 109 decodes data supplied from the equalization processing circuit 106 with the Viterbi algorithm as a publicly known technique, using the second storage element 110, thereby producing decoded data. The trellis decode processing circuit 109 then supplies the decoded data to the data rearranging circuit 111. The Viterbi algorithm is an algorithm for performing a decoding process by calculating a state transition probability sequentially on the basis of likelihood information included in input data, performing traceback processing in accordance with the state transition probability calculated from data having a data length (traceback length) corresponding to a given number of data items, and selecting the likeliest path. In other words, the given number of data items to be arranged by the equalization circuit 105 is a number depending on a length of traceback processing attributable to decoding performance of the trellis decoding circuit 108.

The data group supplied from the equalization processing circuit 106 has data to be decoded and output, in its posterior half (the amount of the data being equivalent to the traceback length), and data that follow the data to be decoded and output, in its anterior half (the amount of the data being equivalent to the traceback length). Therefore, the trellis decode processing circuit 109 divides the data group into two parts and determines a likeliest path state in a second-stage traceback in the posterior half of the data group by performing a first-stage traceback in the anterior half of the data group. Since the trellis decode processing circuit 109 executes traceback in the two stages and gives the decoded result of the posterior half of the data group to the data rearranging circuit 111 in a byte unit, the second storage element 110 can be configured by the smallest amount of memory equivalent to the traceback length.

The second storage element 110 stores the state transition probability calculated by the trellis decode processing circuit 109 in the traceback processing.

The data rearranging circuit 111 rearranges the data items decoded by the trellis decoding circuit 108 in the order (i.e., second order) in which the data items have been multiplexed in the trellis-coded modulation signal, or in which the data items have been input to the plurality of trellis-coded modulators 132. The data rearranging circuit 111 includes a data rearrangement processing circuit 112 and a third storage element 113.

The data rearrangement processing circuit 112 has the third storage element 113 store the decoded data items supplied from the trellis decode processing circuit 109, every twelve bytes cyclically, thereby restoring the order of data items that has been changed when they are read from the first storage element 107. The data rearrangement processing circuit 112 then rearranges the data items stored in the third storage element 113 regularly in a reverse order of the data order arranged on the transmitting side circuit.

The third storage element 113 stores data items as controlled by the data rearrangement processing circuit 112.

Figure 4:
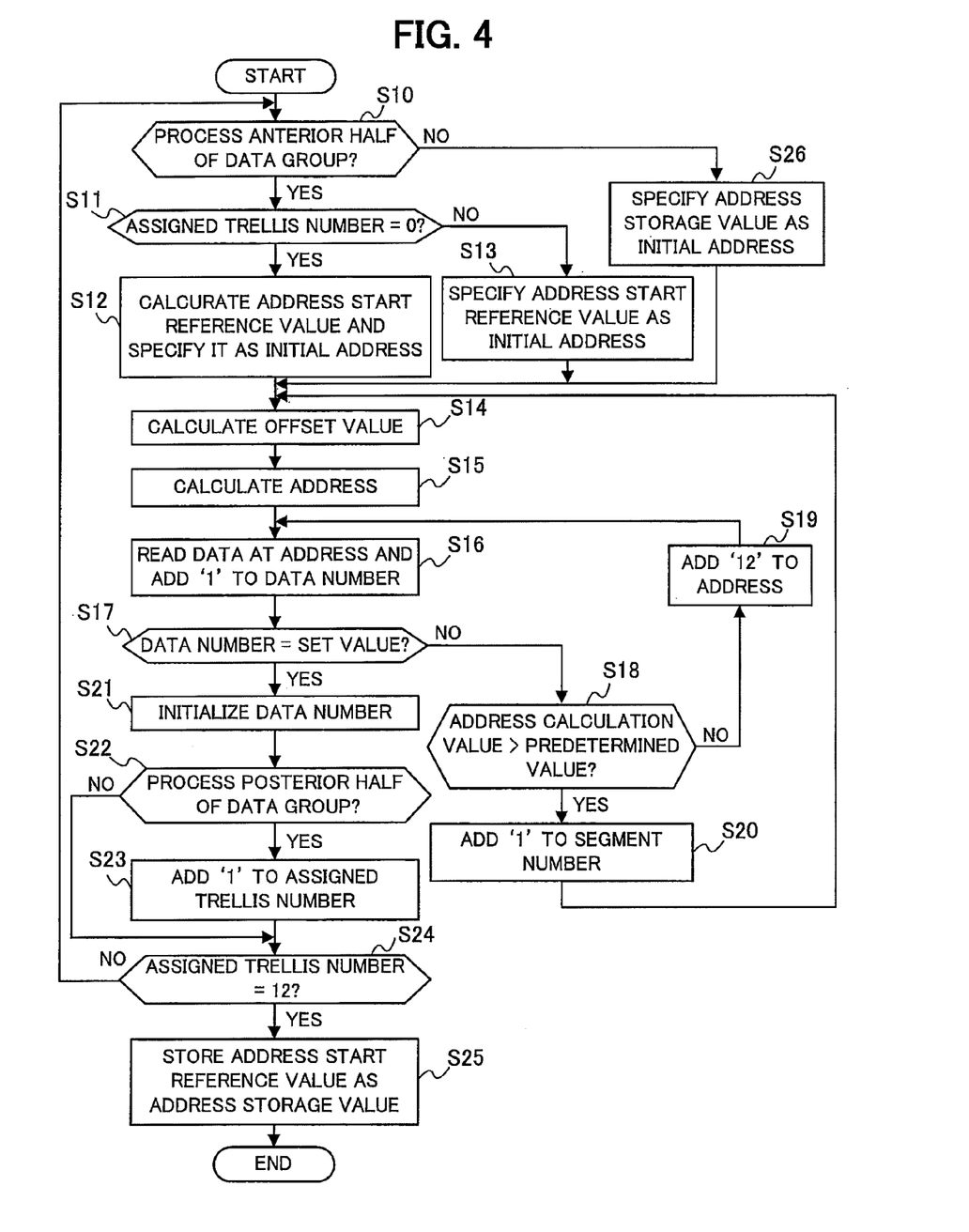
FIG. 4 is a flowchart illustrating a process in which an equalization circuit reads out data from a first storage element.

FIG. 4 is a flowchart illustrating a process in which the equalization processing circuit 106 as a storage control unit, reads out data from the first storage element 107. In the process illustrated in FIG. 4, data indicated by the trellis-coded modulation signal are recorded and then read out, and the data group described above can be configured.

The equalization processing circuit 106 monitors the processing to determine whether read data are an anterior half or a posterior half of the data group, since the read data address depends on whether the read data are an anterior half or a posterior half of the data group modulated by the trellis-coded modulator 132 (S10). When it is determined that the anterior half of the data group is processed (YES in step S10), the process proceeds to step S11. When it is determined that the posterior half of the data group is processed (NO in step S10), the process proceeds to step S26.

In step S11, the equalization processing circuit 106 confirms the number (assigned trellis number) of the trellis-coded modulator 132 which has modulated the data to be read. In this embodiment, an initial value of the assigned trellis number is '0', which indicates the trellis-coded modulator 132_#0. If the assigned trellis number is '0' (YES in step S11), the process proceeds to step S12. If the assigned trellis number is not '0' (NO in step S11), or if the assigned trellis number is any number from '1' to '11', the process proceeds to step S13.

In step S12, the equalization processing circuit 106 calculates an address start reference value by adding the total amount of data modulated by the respective trellis-coded modulators 132 that are to be read in units of a given number of data items, to an address storage value stored in a memory (address storage unit) 106a of the equalization processing circuit 106, as given by expression (1) below.

(Address start reference value)=(Address storage value)+12×(Set value)    (1)

In the expression (1), the total amount is "12×(Set value)". The set value is the number (fixed number) of data items included in the data block. The set value may be given from the outside or may be predetermined.

The equalization processing circuit 106 specifies a calculated address start reference value as an initial address value that indicates an initial address.

In step S13, the equalization processing circuit 106 specifies the address start reference value which has already been calculated in step S12 as the initial address value.

The equalization processing circuit 106 then calculates an offset value, considering the start position of the trellis-coded modulator 132 which has modulated the data to be read in each segment (S14). The offset value indicates the difference between the initial address and the data read address, and is calculated as given by expression (2) below. As described earlier, the start position of the trellis-coded modulator 132 is cyclically selected in turn in each segment with reference to the field synchronization signal from three possible start positions: the trellis-coded modulator 132_#0, the trellis-coded modulator 132_#4, and the trellis-coded modulator 132_#8.

(Offset position)=($N$+(8×$A$)mod 12)+1    (2)

In expression (2), the value N is the number, 0 to 11, following the hash sign # added at the end of the trellis-coded modulator 132 which has modulated the data to be read. The value A ranges from 0 to 2, respectively corresponding to symbol-order numbers 1 to 3, of the segment containing the data to be read. The value A can be calculated as a remainder given by dividing the segment number by 3.

The equalization processing circuit 106 next calculates an address value that indicates an address by adding the offset value to the initial address value (S15).

The equalization processing circuit 106 reads out data at an address corresponding to the calculated address value in the first storage element 107 and adds '1' to the number of read data items (S16). The initial value of the number of the read data items is '0'. In FIG. 4, "DATA NUMBER" represents the number of the read data items.

Next, the equalization processing circuit 106 determines whether the number of read data items reaches the set value specified in step S12 (S17). If the number of read data items has not reached the set value (NO in step S17), the process proceeds to step S18. If the number of read data items has reached the set value (YES in step S17), the process proceeds to step S21.

In step S18, the equalization processing circuit 106 determines whether the address calculation value, which is obtained by subtracting the initial address value from the address value and adding '12', exceeds a predetermined value, which is here the number of the data items (e.g., a value of 828) included in a single segment. If the address value does not exceed the predetermined value (NO in step S18), the process proceeds to step S19. If the address value exceeds the predetermined value (YES in step S18), the process proceeds to step S20.

In step S19, the equalization processing circuit 106 adds '12' to the address value. Then, the process proceeds to step S16.

In steps S16 to S18, the equalization processing circuit 106 repeatedly reads out data at the address obtained by adding '12' to the last address value until the address calculation value exceeds the predetermined value.

In step S20, the equalization processing circuit 106 adds '1' to the segment number. The initial value of the segment number is '0'. The process then proceeds to step S14.

In step S17, if it is determined that the number of the read data items has reached the set value (YES in step S17), the equalization processing circuit 106 initializes the number of the read data items (S21).

The equalization processing circuit 106 then checks whether the data to be read next are a posterior half of a data group (S22). If the data to be read next are a posterior half of a data group (YES in step S22), the process proceeds to step S23. If the data to be read next are not a posterior half of a data group (NO in step S22), or if the data to be read next are an anterior half of a data group, the process proceeds to step S24.

In step S23, the equalization processing circuit 106 adds '1' to the number assigned to the trellis-coded modulator 132 which has modulated the data to be read. The process then proceeds to step S24.

In step S24, the equalization processing circuit 106 determines whether the number assigned to the trellis-coded modulator 132 which has modulated the data to be read has reached '12'. If the number has not reached '12' (NO in step S24), the process proceeds to step S10. In that case, the equalization processing circuit 106 repeats step S10 and subsequent steps to read the posterior half of the data group. If the number reaches '12' (YES in step S24), the process proceeds to step S25.

In step S25, the equalization processing circuit 106 stores the address start reference value calculated in step S12 as an address storage value in the memory 106a.

If it is determined in step S10 that the data to be read next are a posterior half of a data group (NO in step S10), the process proceeds to step S26. In step S26, the equalization processing circuit 106 specifies the address storage value stored in the memory 106a as the initial address value in order to start the processing of the posterior half of the data group. Then, after the value is specified, the process proceeds to step S14.

Figures 5A, 5B:
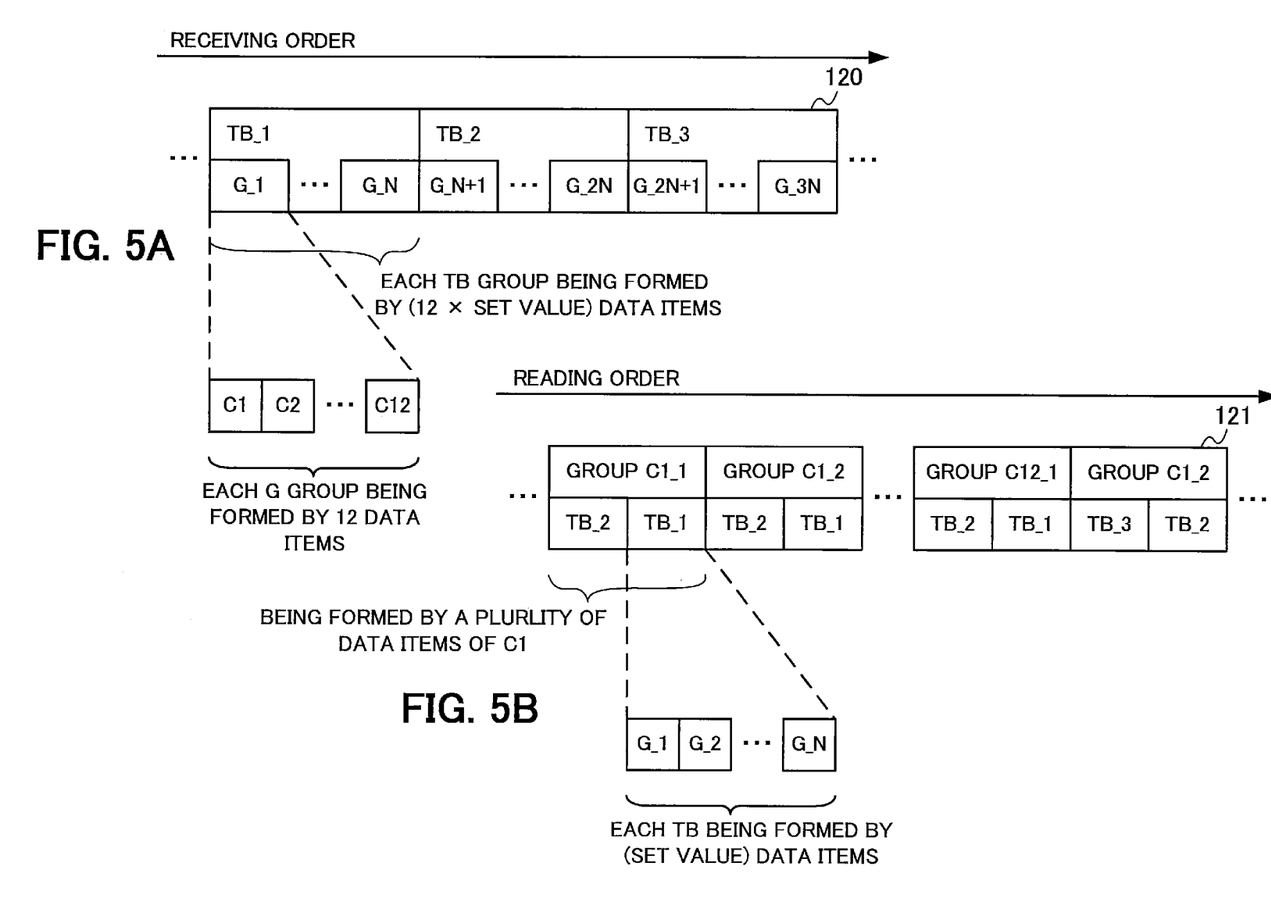
FIGS. 5A and 5B are schematic diagrams showing data configurations and input-output timing of data input to and data output from the first storage element in the receiving apparatus according to the embodiment.

FIGS. 5A and 5B are schematic diagrams showing data configurations and input-output timing of data input to and data output from the first storage element 107 in the receiving apparatus 100 according to the embodiment.

In FIG. 5A, the data 120 input to the first storage element 107 are divided in units of 'the set value multiplied by twelve' to produce divided data that constitutes data groups referred to as TB-groups. Each of the TB-groups has as many G-groups as the set value. Each of the G-groups has twelve data items C1 to C12. In FIG. 5A, the set value is N, where N is an integer not smaller than 2. In other words, data items forming a single G-group are referred to as data items C1 to C12. Each of the data items C1 to C12 are data modulated by the trellis-coded modulators 132_#0 to 132_#11 respectively.

Data 120 input to the first storage element 107 are stored in the order in which they are input, and the data 120 are read as illustrated in the flowchart shown in FIG. 4. Read data 121 are as shown in FIG. 5B. As shown in FIG. 5B, the read data 121 include C1- to C12-groups in that order: in each of C1-group, C2-group, C12-group, the data C1 to C12 modulated by the same trellis-coded modulator 132 is gathered. Each C-group includes data CM (M is an integer satisfying 1≤M≤12), and the amount of data of each C-group is a value of the set value multiplied by two. Each C-group has different read positions in the anterior half and the posterior half, and the anterior half of the C1-group 1 has the same data as the posterior half of the C1-group 2.

The C1-group to be read will be described in detail. The read order of data items in the C1-group 1 is as follows: 'TB_2/G_N+1/C1', 'TB_2/G_N+2/C1', ..., 'TB_2/G_2N/C1', 'TB_1/G_1/C1', 'TB_1/G_2/C1', ..., 'TB_1/G_N/C1'.

Here, 'TB_2/G_N+1/C1' represents a data item C1 included in a G-group G_N+1 included in a TB-group TB_2.

Figure 6:
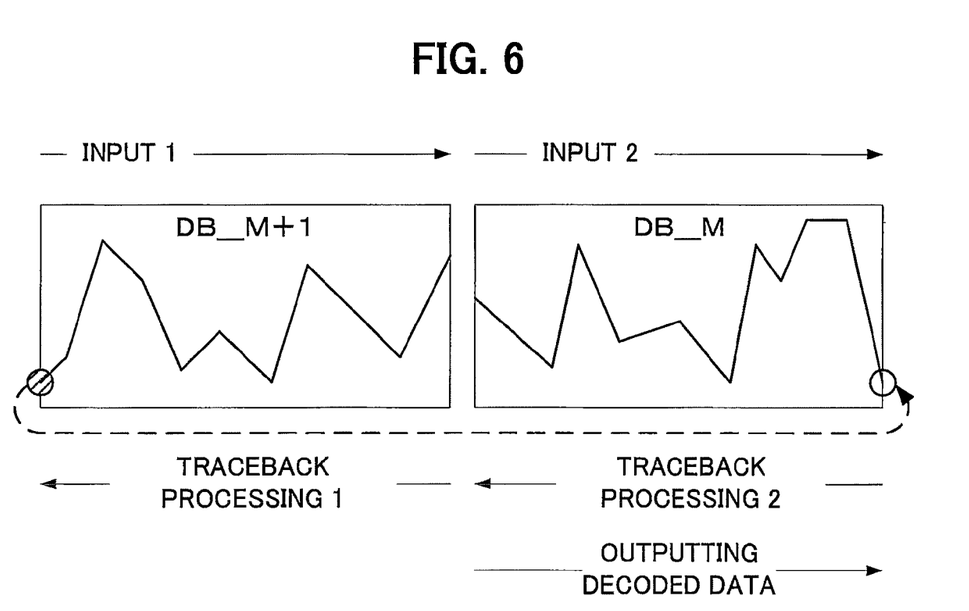
FIG. 6 is a conceptual diagram illustrating traceback processing by a trellis decoding circuit in the receiving apparatus in the embodiment.

FIG. 6 is a conceptual diagram illustrating the traceback processing of the trellis decode processing circuit 109 of the receiving apparatus 100 in the embodiment. In FIG. 6, DB_M+1 and DB_M denote data blocks included in a single data group. The data block DB_M+1 indicates an anterior-half data block of the single data group, and the data block DB_M indicates a posterior-half data block of the same single data group. The data block DB_M stores data encoded and modulated by one of the trellis-coded modulators 132 in the order in which the data have been multiplexed. The data block DB_M+1 includes data encoded and modulated by one of the trellis-coded modulators 132, following the data included in the data block DB_M, in the order in which the data have been multiplexed.

As shown in FIG. 6, data of the data block DB_M+1 are first supplied to the trellis decode processing circuit 109 in an input 1, and the trellis decode processing circuit 109 calculates the channel states of the input data successively, and stores them in the second storage element 110.

Data of the traceback length are then input to the trellis decode processing circuit 109. When the trellis decode processing circuit 109 finishes calculating the channel states, the trellis decode processing circuit 109 calculates the likeliest state of the last input data and selects the likeliest path by the traceback processing 1 starting from the likeliest state. The trellis decode processing circuit 109 then records just the likeliest state obtained for the input data input at the beginning of the data block DB_M+1 in a memory (likeliest state storage unit) 109a in the trellis decode processing circuit 109, for example.

Next, in an input 2, data of the data block DB_M are input to the trellis decode processing circuit 109. The trellis decode processing circuit 109 successively calculates the channel states of the input data in the same manner as for the data block DB_M+1 and stores them in the second storage element 110.

Data corresponding to the traceback length is then input to the trellis decode processing circuit 109. When the trellis decode processing circuit 109 finishes calculating the channel states, the trellis decode processing circuit 109 selects the likeliest path by the traceback processing 2 starting from the likeliest state obtained with the data block DB_M+1 (likeliest state stored in the memory 109a). After finishing the traceback processing 2, the trellis decode processing circuit 109 supplies decoded data to the data rearrangement processing circuit 112 in order in which they have been input as the input 2.

As described above, the trellis decode processing circuit 109 receives the two data blocks from the equalization processing circuit 106, obtains a plurality of likeliest states by performing trellis decoding of the data block which has been modulated later, identifies, from the likeliest states, a single likeliest state at which the traceback processing of the data block which has been modulated earlier starts, and performs trellis decoding of the data block which has been modulated earlier by using the single identified likeliest state.

The processing described above may be implemented by performing the storage processing of the data block DB_M at the same address as the address the traceback processing of the data block DB_M+1 has been performed. For example, if memory addresses 1 to 50 have been read to perform the traceback processing of the data block DB_M+1, the trellis decode processing circuit 109 calculates the channel states for data of the data block DB_M that have been input after the readout of the data block DB_M+1 is completed and writes them in descending order from address 50. The second storage element 110 having 50 addresses, for example, is enough for performing the processing.

The trellis decode processing circuit 109 may use double-speed clock and read data from the first storage element 107, taking the interval of traceback processing into consideration. Other methods that can produce the same effects may also be used.

As shown in FIG. 6, the data group includes the data block DB_M+1 and the data block DB_M in this embodiment, but the data configuration is not confined to that. For example, the data groups may include the data block DB_M or the data block DB_M+1 respectively. In that case, steps S10 and S22 in FIG. 4 become unnecessary. Furthermore, in that case, the data block DB_M, the data block DB_M+1, and subsequent data blocks are successively input to the trellis decode processing circuit 109 to be processed.

In the receiving apparatus 100 according to this embodiment, the trellis decode processing circuit 109 can successively decode the data read from the storage element 107. Accordingly, it becomes unnecessary to have a plurality of trellis decoding circuits 109; the size of the trellis decode processing circuit 109 can be reduced; and the required memory capacity of the trellis decode processing circuit 109 can be small.

In the receiving apparatus 100 according to this embodiment, the data read from the first storage element 107 can be configured to calculate the likeliest path state of the traceback beforehand with respect to the data decoded and output in the traceback processing by using the Viterbi algorithm in the trellis decode processing circuit 109. Therefore, the required memory capacity and the circuit size can be reduced.

The embodiment described here is an example in all respects and is not restrictive. The scope of the present invention is indicated not by the embodiment but by the claims, and it is intended that all changes in the meaning and scope that are equivalent to the claims are included.

In the embodiment described above, the equalization processing circuit 106 and the trellis decode processing circuit 109 have the memories 106*a* and 109*a* respectively, but they may have other configurations. For example, the equalization processing circuit 106 and the trellis decode processing circuit 109 may store necessary information in an external memory, which is not shown in the figure.

The processing performed in the receiving apparatus shown in FIG. 1 may be implemented by a control unit such as a CPU and a software executed by the control unit, for example.

What is claimed is:

1. A receiving apparatus comprising:
a receiving unit which receives a trellis-coded modulation signal in which data items modulated by a plurality of trellis-coded modulators have been multiplexed;
a data processing unit which performs an arrangement processing of arranging the data items multiplexed in the trellis-coded modulation signal received by the receiving unit so that a given number of data items modulated by one of the trellis-coded modulators are arranged consecutively and repeatedly in a first order in which the data items modulated by one of the trellis-coded modulators have been modulated, and repeats the arrangement processing for remaining trellis-coded modulators;
a trellis decoding unit which performs trellis decoding of the data items arranged by the data processing unit, thereby producing decoded data items; and
a data rearranging unit which rearranges the decoded data items in second order in which the decoded data items have been multiplexed in the trellis-coded modulation signal.

2. The receiving apparatus of claim 1, wherein the given number of data items to be arranged by the data processing unit is a number depending on a length of traceback processing attributable to decoding performance of the trellis decoding unit.

3. The receiving apparatus of claim 1, wherein:
the data processing unit supplies the trellis decoding unit with two data blocks consecutive in order in which the two data blocks have been modulated by one of the trellis-coded modulators, each of the two data blocks including the given number of consecutive data items arranged by the data processing unit in the first order in which the data items modulated by one of the trellis-coded modulators have been modulated, one of the two data blocks containing the given number of consecutive data items in an anterior portion thereof, the other of the two data blocks containing the given number of consecutive data items in a posterior portion thereof; and
the trellis decoding unit receives the two data blocks from the data processing unit, obtains a plurality of likeliest states by performing trellis decoding of the data block which has been modulated later, identifies, from the likeliest states, a single likeliest state at which the traceback processing of the data block which has been modulated earlier starts, and performs trellis decoding of the data block which has been modulated earlier by using the single identified likeliest state.

4. The receiving apparatus of claim 1, wherein the data processing unit comprises:
a first storage unit which stores data indicated by the trellis-coded modulation signal received by the receiving unit; and
an equalization processing unit which corrects distortion of the trellis-coded modulation signal received by the receiving unit;
the equalization processing unit reading out the given number of consecutive data items multiplexed in the trellis-coded modulation signal received by the receiving unit from the data items stored in the first storage unit, and arranging the read data items in the first order in which the data items modulated by one of the trellis-coded modulators have been modulated.

5. The receiving apparatus of claim 1, wherein the trellis decoding unit comprises:
a second storage unit which can store just an amount of data corresponding to the given number of data items; and
a trellis decode processing unit which has the second storage unit store the given number of consecutive data items supplied from the data processing unit and performs trellis decoding of the given number of consecutive data items.

6. The receiving apparatus of claim 1, wherein the data rearranging unit comprises:
a third storage unit; and
a data rearrangement processing unit which rearranges the data items decoded by the trellis decoding unit in the second order in which the data items have been multiplexed in the trellis-coded modulation signal and has the third storage unit store the rearranged data items.

7. The receiving apparatus of claim 1, wherein the trellis-coded modulation signal changes its multiplexing order with a given period.

8. A receiving method comprising:
a reception step of receiving a trellis-coded modulation signal in which data items modulated by a plurality of trellis-coded modulators have been multiplexed;
a data processing step of performing an arrangement processing of arranging the data items multiplexed in the trellis-coded modulation signal received in the reception step so that a given number of data items modulated by one of the trellis-coded modulators are arranged consecutively and repeatedly in a first order in which the data items modulated by one of the trellis-coded modulators have been modulated, and repeating the arrangement processing for remaining trellis-coded modulators;
a trellis decoding step of performing trellis decoding of the data items arranged in the data processing step, thereby producing decoded data items; and
a data rearranging step of rearranging the decoded data items in second order in which the decoded data items have been multiplexed in the trellis-coded modulation signal.

9. The receiving apparatus of claim 8, wherein the given number of data items to be arranged in the data processing step is a number depending on a length of traceback processing attributable to decoding performance in the trellis decoding step.

10. The receiving method of claim 8, wherein:
the data processing step supplies the trellis decoding step with two data blocks consecutive in order in which the two data blocks have been modulated by one of the trellis-coded modulators, each of the two data blocks including the given number of consecutive data items arranged in the data processing step in the first order in which the data items modulated by one of the trellis-coded modulators have been modulated, one of the two data blocks containing the given number of consecutive data items in an anterior portion thereof, the other of the two data blocks containing the given number of consecutive data items in a posterior portion thereof; and the trellis decoding step receives the supplied from the data processing step, obtains a plurality of likeliest states by performing trellis decoding of the data block which has been modulated later, identifies, from the likeliest states, a single likeliest state at which the traceback processing of the data block which has been modulated earlier starts, and performs trellis decoding of the data block modulated earlier by using the single identified likeliest state.

11. The receiving method of claim 8, wherein the data processing step comprises:
   a first storage step of storing data indicated by the trellis-coded modulation signal received in the reception step; and
   an equalization processing step of correcting distortion of the signal received in the reception step;
   the equalization processing step reading out the given number of consecutive data items multiplexed in the trellis-coded modulation signal received in the receiving step from the data items stored in the first storage step, and arranging the read data items in the first order in which the data items modulated by one of the trellis-coded modulators have been modulated.

12. The receiving method of claim 8, wherein the trellis decoding step comprises:
   a second storage step of storing just an amount of data corresponding to the given number of data items; and
   a trellis decode processing step of having the second storage step store a given number of consecutive data items supplied from the data processing step and performing trellis decoding of the given number of consecutive data items.

13. The receiving method of claim 8, wherein the data rearranging step comprises:
   a third storage step; and
   a data rearrangement processing step of rearranging the data items decoded in the trellis decoding step in the second order in which the data items have been multiplexed in the trellis-coded modulation signal and storing the rearranged data items in the third storage step.

14. The receiving method of claim 8, wherein the trellis-coded modulation signal changes its multiplexing order with a given period.

* * * * *